United States Patent [19]

Metzinger et al.

[11] 3,865,672

[45] Feb. 11, 1975

[54] PROCESS FOR THE REMOVAL OF VOLATILES FROM POLYMER SOLUTIONS

[75] Inventors: Lothar Metzinger, Bad Duerkheim; Alfred Gottschalk, Wachenheim; Klaus Schoettle, Ludwigshafen; Josef Schwaab, Maikammer, all of Germany

[73] Assignee: Badische Anilin-& Soda-Fabrik Aktiengesellschaft, Ludwigshafen/ Rhine, Germany

[22] Filed: July 26, 1972

[21] Appl. No.: 275,360

[52] U.S. Cl. ............................................. 159/47 R
[51] Int. Cl. .......................... B01d 1/00, F26b 7/00
[58] Field of Search .... 159/13 R, 13 A, 13 B, 13 C, 159/49, DIG.47; 260/80.78, 82.7, 85.5

[56] References Cited
UNITED STATES PATENTS

| | | | |
|---|---|---|---|
| 2,266,941 | 12/1941 | Van de Griendt | 203/89 X |
| 2,731,081 | 1/1956 | Mayner | 159/49 |
| 2,914,120 | 11/1959 | Hunt et al. | 159/27 D |
| 2,941,985 | 6/1960 | Amos et al. | 260/80.78 |
| 3,147,174 | 9/1964 | Cook | 159/47 V |
| 3,201,365 | 8/1965 | Charlesworth et al. | 159/13 A X |

*Primary Examiner*—Jack Sofer
*Attorney, Agent, or Firm*—Johnson, Keil, Thompson & Shurtleff

[57] ABSTRACT

Process for the removal of volatiles, in a single stage by vacuum evaporation, from polymer solutions obtained in the continuous solution polymerization of monomer mixtures containing acrylonitrile or methacrylonitrile.

The evaporation is effected in a devolatilizing zone in which the temperature of the polymer solution rises in its direction of flow.

This process causes no damage to the polymers on account of decomposition products of the heat-sensitive nitrile monomers.

6 Claims, 1 Drawing Figure

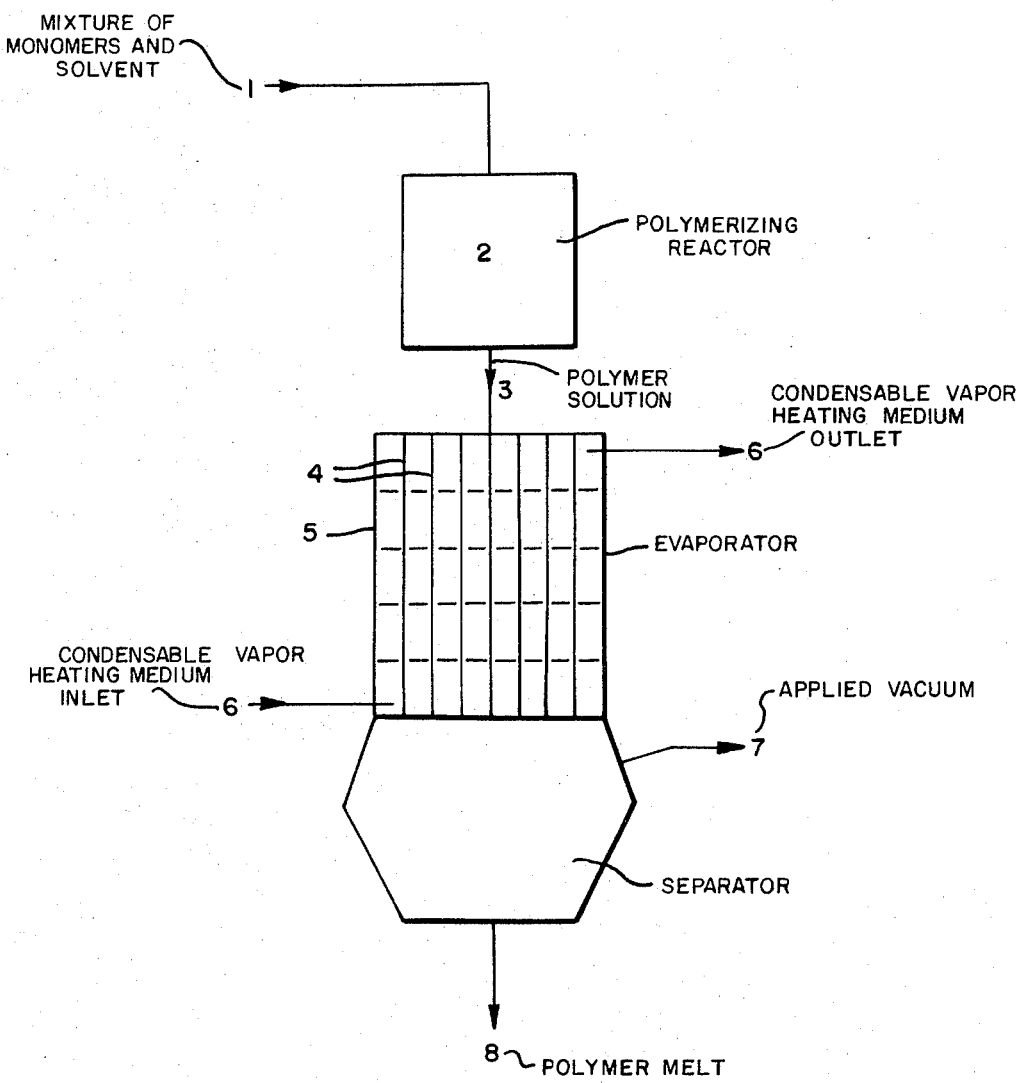

PROCESS FOR THE REMOVAL OF VOLATILES FROM POLYMER SOLUTIONS

This invention relates to a process for single-stage removal of volatiles, by continuous vacuum evaporation, from polymer solutions obtained in the continuous solution polymerization of monomer mixtures containing acrylonitrile or methacrylonitrile.

The polymers produced by solution polymerization are obtained in the form of a solution in solvent and unconverted monomer. Thus to isolate the polymers it is necessary to remove the volatile components from the reaction mixture by evaporation with heating, if necessary under reduced pressure. The heat required for evaporation may be applied for example in devolatilizing extruders (see Great Britian Pat. Nos. 738,473 and 1,037,547) or specially designed heat exchangers (see small difference between the temperatures of the incoming and outgoing heating medium. This single-stage method may be used to advantage on some polymer solutions but has serious drawbacks when applied to other polymer solutions. For example, if solutions of copolymers of styrene and acrylonitrile are worked up by this method, black decomposition products occur after only a short on-stream period and these deposits increasingly contaminate the transparent copolymer thus considerably detracting from its usefulness. Attempts have already been made to overcome this drawback by removing the volatiles in two stages when working up the solutions obtained in the copolymerization of styrene and acrylonitrile. In this method, which is described in U.S. Pat. No. 2,941,985, the first stage consists of the removal of the major portion of the unreacted acrylonitrile from the polymer solution at a relatively low temperature. The removal of the remaining portions from the polymer is then effected in a second stage at substantially higher temperatures. However, this two-stage vacuum evaporation process has the drawback that in the manufacture of copolymers having high contents of acrylonitrile it is difficult to remove sufficient of the heatsensitive acrylonitrile in the first evaporating stage to prevent the occurrence, in the second stage, of decomposition products which spoil the appearance of the copolymer. This two-stage method also suffers from the disadvantage that at the relatively low degassing temperature used in the first stage the partially devolatilized polymer solution cools very quickly when relatively large quantities of acrylonitrile have to be evaporated. This cooling may cause the viscosity of the remaining solution to increase to such an extent that it is no longer liquid enough to be transferred to the second evaporating stage.

It is an object of the invention to provide a process for the removal of volatiles from the polymer solutions obtained in the solution polymerization of monomer mixtures containing acrylonitrile or methacrylonitrile, in which process the above drawbacks do not occur.

The above object is achieved by a single-stage vacuum evaporation process carried out in a devolatilizing zone in which the temperature rises continuously or stepwise in the direction of flow of the polymer solution. Preferably, this vacuum evaporation process is carried out in a vertical or substantially vertical zone, the polymer solution being fed to the top thereof so that the polymers arrive at the bottom of the zone in the form of a vapor melt mixture. The said rise in temperature means that the removal of acrylonitrile from the polymer solution by evaporation occurs at substantially low temperatures and further polymerization and decomposition of the acrylonitrile in the liquid stage is prevented. The heat required for the vaporization is supplied through a gaseous or liquid heating medium which passes in direct heat exchange through the devolatilizing zone through ducts separated from the polymer solution. The rise in temperature of the polymer solution in its direction of flow is caused by a corresponding decrease in the temperature of the heating medium in the counter-direction.

Adjustment of the temperature profile of the heating medium may be effected in a number of ways. For example, the heating medium may be caused to pass through separate closed horizontal zones in which the temperatures of the heating media show graded differences.

Alternatively, a vapor heating medium may be fed to the heat exchanger at the end constituting the exit for the polymer melt and caused to condense to an increasing extent as it passes up through partially closed and preferably horizontal zones countercurrently to the polymer solution with decreasing partial pressure. This decrease in the partial pressure may be obtained by metering inert gas to the heating medium in one or more of the zones. The inert gas can be fed to the heat exchanger together with the condensable vapor at the polymer melt outlet. It is also possible, however, to admix the inert gas with the vaporous heating medium in the heat exchanger at one or more points between inlet and outlet. The location of the point where the inert gas is added to the condensable vapor and the quantity of the inert gas used depend upon where and to what extent the temperature of the heating medium is to be lowered. The arrangement of the partially closed zones and the vapor distribution should preferably be such that zones of approximately uniform temperature are formed perpendicularly to the direction of flow of the polymer solutions.

Another possibility is to use vapor mixtures in which the components have different condensation temperatures.

Suitable heating media are for example organic heat-transfer media in liquid or gaseous form. The difference between the hottest and coldest zones should be at least 40°C and preferably more than 60°C but advantageously not more than 250°C. For example, the temperature at the top heating one (polymer solution inlet to the devolatilizing zone) may be between 100° and 180°C and that in the bottom heating zone (polymer melt outlet from the devolatilizing zone) may be between 200° and 350°C. The temperatures between these two extremes should nowhere be greater than the upper temperature limit at the bottom zone i.e., 350°C and should steadily rise from the top zone to the bottom zone.

When the polymer melt containing the volatiles in gaseous or partially dissolved form leaves the devolatilizing zone, the melt is separated from the vapor. This may be conveniently done by applying vacuum, preferably of from about 10 to 100 mm of Hg. Degassing is carried to an extent at which only 2 percent and preferably only 0.5 percent by weight of volatiles remains in the polymer melt.

The process of the invention is particularly suitable for removing monomers from copolymer solutions containing acrylonitrile or methacrylonitrile. Particularly suitable comonomers are styrene, α-methylstyrene, acrylates and methacrylates. The amount of acrylonitrile or methacrylonitrile present therein may be from 10 to 80 percent. The process is also suitable for devolatilizing solutions of terpolymers of the above monomer. Preferably, the process is used in the production of copolymers of styrene with from 15 to 40 percent by weight of acrylonitrile.

The polymer solutions to be devolatilized by the process of the invention may contain any of the usual solvents employed in solution polymerization, preferably hydrocarbons such as alkylaromatics. The solids content of the solutions to be devolatilized is generally between 30 and 90 percent and preferably between 40 and 70 percent by weight.

Particularly suitable apparatus for carrying out the process of the invention consists of preferably vertical tube bundle heat exchanger to which the polymer solution is fed at the top and in which the tube walls are heated so as to show a steady increase in temperature in the direction of flow of the product. This rising temperature profile may be achieved for example by heating the heat exchanger with a mixture of vapor and inert gas, the concentration of inert gas therein increasing from the bottom to the top of the heat exchanger. Alternatively, the heat exchanger may be subdivided into a number of zones provided with separate flows of heating media at graded temperatures.

An embodiment of the apparatus of the invention is illustrated diagrammatically in the accompanying drawing.

The mixtures of monomers and solvent (1) is fed to a reactor 2, where it is polymerized. The polymer solution 3 flows through the tubes 4 of a vertical heat exchanger 5. The heat exchanger is heated by passing a vaporous organic heating medium 6 into the heating chambers to fill the entire volume of heating space with saturated vapor. Inert gas is then metered to the vapor at certain points in order to effect progressive reduction of the vapor concentration counter to the direction of flow of the polymer solution and thus achieve the desired temperature grading of the polymer solution. A temperature gradient is maintained in the heating medium, with its temperature decreasing at least 40°C and preferably more than 60°C from the outlet for the polymer solution to the inlet therefor. An applied vacuum 7 removes the volatiles, whilst the polymer melt 8 is removed from the apparatus.

In the following Examples the parts and percentages are by weight.

EXAMPLE 1

An approximately 65 percent solids polymer solution obtained in the continuous solution polymerization of styrene and acrylonitrile is fed to a vertical tube bundle heat exchanger. The liquid phase consists of 40 percent of ethylbenzene and 23 percent of monomeric unreacted styrene and 37 percent of acrylonitrile. The inlet temperature of the polymer solution is about 150°C. The polymer solution flows down through the tubes of the heat exchanger which are heated at a temperature of from 180° to 200°C at the top of the apparatus and at 300°C at the bottom. An approximately even fall of temperature from the bottom to the top of the apparatus is effected by suitable feeding to the heat exchanger a heating mixture of diphenyl and diphenyl oxide, and metering into the mixture inert gas. The inert gas is added to the heating-medium mixture of diphenyl and diphenyl oxide at the bottom of the apparatus and the heating-medium mixture circulated upward through the heat exchanger countercurrently to the polymer solution. When the polymer melt leaves the tubes, the vapor formed is separated from the solid material by applying a vacuum of approx. 40 mm Hg. The copolymer, which contains 35 percent of acrylonitrile and has a temperature of about 240°C, contains less than 0.3 percent of volatile components. Using the above apparatus under the test conditions given above, there is obtained a styrene/acrylonitrile copolymer of very light color. During the test, the apparatus was used continuously for a period of several months, during which time it provided a product which was completely free from black specks.

COMPARATIVE EXAMPLE

A polymer solution of the same composition as that described in Example 1 is passed down through the same heat exchanger as that used in Example 1, the temperature of the solution being about 150°C. The tubes of the heat exchanger are in this case heated with a vaporous mixture of diphenyl and diphenyl oxide as heating medium so as to obtain a given temperature within the range of from 280° to 300°C over the entire length of the tubes from bottom to top. The throughput of polymer solution is the same as in Example 1. There is obtained a styrene/acrylonitrile copolymer having a color which is not as light as that in Example 1. After an on-stream period of 25 days, the concentration of black specks in the polymer becomes so great that the heat exchanger has to be shut off and thoroughly cleaned.

We claim:

1. A continuous single-stage process for removing volatiles from a polymer solution obtained by solution polymerization of a monomer mixture containing from 10 to 80 percent by weight of acrylonitrile or methacrylonitrile, said solution having a solids content of from 30 to 90 percent by weight, which comprises continuously conducting said solution at a temperature of from 100° to 180°C in indirect countercurrent heat exchange relationship to a fluid heating medium to progressively increase the temperature of the solution to from 200° to 350°C, maintaining a temperature gradient in said heating medium with its temperature decreasing at least 40°C from the outlet for said solution to the inlet therefor, and continuously applying a vacuum of from 10 to 100 millimeters of mercury to the heated product to reduce the content of volatiles therein to a maximum of 2 percent by weight.

2. A process as set forth in claim 1, wherein said polymer is a copolymer of styrene and from 15 to 40 percent by weight of acrylonitrile.

3. A process as set forth in claim 1, wherein said heating medium is a condensable vapor, and an inert gas is admixed with the condensable vapor at one or more points between the inlet and outlet for the heating medium to effect a progressive reduction of the medium vapor concentration flowing countercurrently to the said solution to thereby help maintain said temperature gradient.

4. A process as set forth in claim 1, wherein said heating medium is a condensable vapor, and an inert gas is admixed with the condensable vapor at the inlet for the heating medium to effect a progressive reduction of the medium vapor concentration flowing countercurrently to the said solution to thereby help maintain said temperature gradient.

5. A process as set forth in claim 1, wherein said polymer is a copolymer of acrylonitrile or methacrylonitrile and styrene, alpha-methylstyrene, an acrylate, or a methacrylate.

6. A process as set forth in claim 5, wherein said solution contains an alkylaromatic hydrocarbon solvent.

* * * * *

UNITED STATES PATENT AND TRADEMARK OFFICE
CERTIFICATE OF CORRECTION

PATENT NO. : 3,865,672
DATED : February 11, 1975
INVENTOR(S) : Lothar Metzinger et al.

It is certified that error appears in the above-identified patent and that said Letters Patent are hereby corrected as shown below:

In the Heading, insert--[30] July 30, 1971    Germany

P 21 38 176.0--

*Signed and Sealed this*

*eighteenth* Day of *May 1976*

[SEAL]

*Attest:*

RUTH C. MASON
*Attesting Officer*

C. MARSHALL DANN
*Commissioner of Patents and Trademarks*